United States Patent
Tunney

(10) Patent No.: US 7,031,520 B2
(45) Date of Patent: Apr. 18, 2006

(54) METHOD AND SYSTEM FOR IDENTIFYING MULTIPLE QUESTIONNAIRE PAGES

(75) Inventor: William Patrick Tunney, Montreal (CA)

(73) Assignee: SAP AG, Walldorf (DE)

( * ) Notice: Subject to any disclaimer, the term of this patent is extended or adjusted under 35 U.S.C. 154(b) by 99 days.

(21) Appl. No.: 10/625,596

(22) Filed: Jul. 24, 2003

(65) Prior Publication Data

US 2005/0018905 A1    Jan. 27, 2005

(51) Int. Cl.
G06K 9/00    (2006.01)
G09B 7/00    (2006.01)

(52) U.S. Cl. .................... 382/181; 434/335
(58) Field of Classification Search ........... 382/181, 382/182, 209, 187–188, 317, 203, 218; 345/173, 345/179–181; 434/356–357, 335, 338–9
See application file for complete search history.

(56) References Cited

U.S. PATENT DOCUMENTS

| 4,358,279 | A | * | 11/1982 | Lousig-Nont | 434/363 |
| 4,773,860 | A | * | 9/1988 | Gannaway et al. | 434/335 |
| RE36,656 | E | * | 4/2000 | Califano et al. | 382/199 |
| 6,091,852 | A | * | 7/2000 | Entleitner et al. | 382/181 |
| 6,618,504 | B1 | * | 9/2003 | Yoshino | 382/187 |

FOREIGN PATENT DOCUMENTS

JP    3-170838 A    7/1991

OTHER PUBLICATIONS

IBM Research, "Pen Technologies"; Retrieved from the Internet: Nov. 6, 2003<URL: http://www.research.ibm.com/electricInk/>.
Gyricon, LLC., "SmartPaper", Retrieved from the Internet Nov. 10, 2003<URL http://www.gyriconmedia.com/technology.asp>.

* cited by examiner

*Primary Examiner*—Joseph Mancuso
*Assistant Examiner*—Shefali Patel
(74) *Attorney, Agent, or Firm*—Kenyon & Kenyon

(57) ABSTRACT

A method and system for identifying multiple questionnaire pages. An embodiment of a method includes receiving a set of coordinates from a capture device, the set of coordinates indicating shapes made on multiple pages of a questionnaire without the use of a graphical user interface, and mapping each shape to a questionnaire answer on a different page. The method enables a processor to accurately and quickly determine which answers were entered on each questionnaire page attached to the capture device, without relying on the user to do so. Exemplary applications include a field survey and inventory.

7 Claims, 5 Drawing Sheets

Sample Questionnaire

Q1. Are you male or female?
☐ male   ○ female

Q2. How old are you?
△ 0-19   ⚡ 20-45   ☾ 46+

Q3. How often do you drink carbonated beverages?
▽ sometimes   △ always   ▽ never Q4. What is you favorite color?
◇ red   ◇ blue   ▢ green
⬠ yellow   ⬡ other

300

360

370

☐ FORM 3B

FIG. 3

METHOD AND SYSTEM FOR IDENTIFYING MULTIPLE QUESTIONNAIRE PAGES

BACKGROUND

Handwriting recognition software has made it possible to digitally capture handwriting and transform it into digital characters using an input capture device and a computer. The capture device may be a flat panel device that allows a user to enter normal handwritten scribbles onto a piece of paper attached to the capture device while information about the coordinates of the pen strokes is digitally recorded by the capture device. The capture device can later upload the digitally recorded handwritten scribbles into a computer where an uploading program receives and stores the handwriting scribbles in memory, resulting in two copies of a document, namely the original handwritten version and a second, digitally encoded version.

The capture device can digitally collect multiple pages of handwritten scribbles at a time, just as traditional paper notepads do. In order to logically store the captured scribbles as multiple digital pages, the capture device must be informed when a new page is being written on. To accomplish this, the capture device generally has a navigation button thereon that the user presses when beginning a new page.

Digital handwriting capture is useful when data must be entered into a computer program for later processing, but original handwritten copies must be retained for legal or verification purposes. In these instances, it would be helpful to have handwriting automatically transformed into digital characters and transferred to a computer program without manual data entry. This may be achieved by placing a printed paper form with clearly defined input fields on a capture device, digitally capturing the handwritten scribbles, e.g., drawings and text characters, in these input fields on the capture device, and uploading the digital scribbles to the computer. A recognition program may then interpret the digitally recorded handwritten scribbles in these input fields and transform them into a digitally encoded representation, which can be automatically entered into the computer program in the same manner as if the scribbles were manually entered via a keyboard.

An exemplary application for digital handwriting capture is a questionnaire. A typical questionnaire is a printed paper form containing a collection of questions and a set of answers from which to choose for each question. Each answer has a check box next to it. A printed questionnaire may be attached to the device and the device pen used to check a chosen answer for each question in the questionnaire. As each question is answered, the capture device digitally captures the pen strokes. The format of the captured pen strokes may be a time-ordered sequence of (x,y) coordinates, a sequence of vector coordinates (x,y,t), or any other format capable of indicating when and where on the capture device pen strokes were made.

When the user repeats the questionnaire several times, for example, when surveying the public at a mall, the user may store the multiple questionnaire answers in the capture device without having to upload between questionnaires. After completing one questionnaire, the user presses the navigation button on the capture device to indicate the ending of that questionnaire and the start of a new one. The user then attaches the next questionnaire to the capture device and begins again. When completely done, the user has both the sets of printed questionnaires and the paginated digital capture data. The user may then upload all the data to the computer for later processing, avoiding manual data entry.

Similarly, when the questionnaire is more than one page long, after completing each page and prior to beginning the next one, the user presses the navigation button on the capture device.

However, the problem is that the user often forgets to press the navigation button. When this happens, the user's scribbles from multiple pages are merged into one digital page of capture data, resulting in indecipherable and unusable questionnaire data.

Some systems have tried to solve this problem by providing a page number field at the top of the questionnaire for the user to write in the page number. The problem with this approach is that the user often forgets to write in the page number or writes in the wrong page number. And, even when the user correctly writes in the page number, the computer handwriting recognition program sometimes fails to correctly recognize the number.

Other systems have tried to solve this problem by providing graphical user interfaces to display the questionnaires. A new questionnaire is displayed only after the user submits the current questionnaire data, at which time the page number is automatically recorded. However, in these systems, a more complex input/output device than the capture device must be used to display the graphical user interfaces. Such a device could be expensive and too bulky to carry, particularly for field surveys, field inventory, etc., for which the capture device is ideally suited.

Accordingly, there is a need in the art for a simple and transparent way to identify multiple questionnaire pages without relying on the user to do so.

SUMMARY OF THE INVENTION

Embodiments of the present invention provide a simple and transparent method to identify multiple questionnaire pages. The method includes a processor receiving capture data from the capture device, where the capture data represents writings made on multiple copies of paper. The method further includes the processor detecting the shapes of the writings and comparing the detected shapes with a plurality of shapes stored in memory in association with a logical set. The method further includes the processor, upon matching the detected shapes with the stored shapes, designating to which copy of the paper each matched detected shape belongs. Lastly, the method includes the processor retrieving from memory the data, e.g., questionnaire answers, associated with the matched stored shapes, and then storing the retrieved data according to its designated copy as the writing made on that copy of the paper. The capture data is advantageously generated by simply using pieces of paper and the capture device without having to rely on more complex, bulky devices with graphical user interfaces.

Embodiments of the present invention also provide a system through which multiple questionnaire pages may be identified. The system may include a memory and a processor for receiving capture data corresponding to a set of marks made on multiple copies of a questionnaire attached to a capture device and mapping the capture data to a questionnaire answer on each of the copies.

BRIEF DESCRIPTION OF DRAWINGS

FIG. 3 is an exemplary paper data form that includes a questionnaire to be filled out according to an embodiment of the present invention.

DETAILED DESCRIPTION

Figure 1:
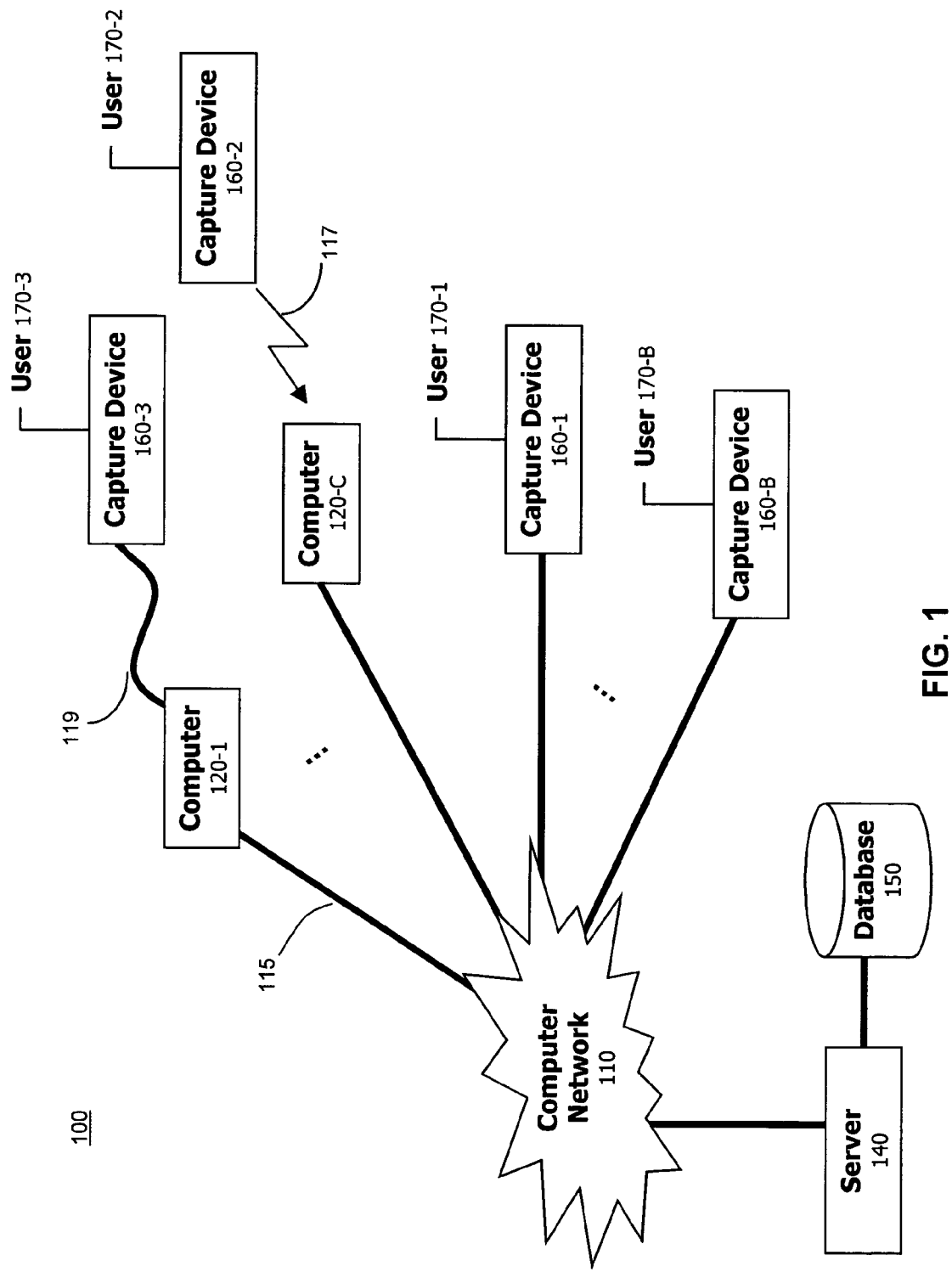
FIG. 1 is an exemplary computer network used to identify multiple questionnaire pages according to embodiments of the present invention.

Embodiments of the present invention provide a method and system for identifying multiple pages of a paper data form (e.g., a questionnaire) attached to a capture device. In these embodiments, the multiple pages refer to multiple copies of a one-page questionnaire. However, it is to be understood that alternate embodiments may include a single questionnaire with multiple pages.

The questionnaire may include a collection of questions and one or more answer choices for each question. Questionnaire answer choices may include the answers themselves and a plurality of check boxes of different shapes, where each answer has a uniquely shaped check box associated with it. A check box in embodiments of the present invention is not limited to a box shape that has to be checked, but may include any shape and may be marked in any manner according to the particular application to indicate that the box has been selected. In these embodiments, a user may simply fill in one of the boxes corresponding to her intended answer to a question. The capture device may digitally capture the pen strokes the user makes when filling in the boxes. The capture device may repeat the digital capture for multiple pages of the questionnaire and then upload this capture data to a computer for further processing according to embodiments of the present invention. Exemplary applications of these embodiments include field surveys, field inventory, and other applications where paper forms are the predominant way data is recorded and device portability and ease of use are preferable.

In embodiments of the present invention, the computer's processor may receive the capture data from a capture device to which multiple pages of a paper data form were previously attached. The capture data format may be a time ordered sequence of (x,y) coordinates, indicating the shapes of the sets of marks (or pen strokes) made on the pages of the form to fill in the correct answers. The processor may then detect the shapes that the sets of marks made on each page based on the coordinates. The processor may compare these detected shapes to a plurality of predefined shapes stored in the computer's memory that are expected to be on the data form. The predefined shapes that match the detected capture shapes may be determined. If there are multiple matches for shapes corresponding to the same question in the paper data form, then the processor may identify the later-made shapes as belonging to later pages of the paper data form. The data form answers on the page that correspond to the predefined shapes may be stored in memory for later use; hence, the multiple pages are identified. In an alternate embodiment, the capture data format may be a sequence of vectors (x, y, t) or any format that appropriately represents the user's pen strokes.

Instead of having to rely on the user to identify the multiple pages, embodiments of the present invention may use the capture data shapes to determine which capture data belongs to which page. The computer may use any known shape recognition techniques, e.g., mathematical models, to detect the check box shapes from the pen strokes. Accordingly, these embodiments advantageously provide a simple and transparent way to accurately identify multiple pages. Hence, data errors are reduced and data entry speed is improved.

FIG. 1 shows an embodiment of an exemplary network that may be used to implement embodiments of the present invention. The exemplary network system 100 may include, but is not limited to, a computer network 110, computers 120-1 through 120-C, where C is an integer, capture devices 160-1 through 160-B used by users 170-1 through 170-B, where B is an integer, to input questionnaire data, a server 140, and a database 150 for storing various questionnaire information used by the computers. These components may be linked to the network 110 via network links 115. The network 110 may be a LAN, WAN, Internet, or any like structure capable of connecting components and transmitting data. The network links 115 may include physical wiring, wireless connections, or any like transmission configuration capable of transmitting data. Alternatively, a capture device 160 may be directly linked via a wireless link 117, a COM cable 119, or any like connector, to a computer 120.

The capture device used in embodiments of the present invention may include a portable input device whose appearance and operation resembles that of a traditional clipboard. The capture device may include a flat panel onto which a piece of paper may be attached and pens used to write on the paper thereby entering data to the capture device. The paper generally replaces a graphical user interface that is included in most input devices. So, typically, the capture device does not include a graphical user interface. The pen strokes made on the paper may be stored in memory on the capture device for later uploading to a computer via a modem, cable, or other transmission device in communication with a port of the capture device. An example of the capture device is the CrossPad™ manufactured by IBM.

In an embodiment, the capture device may include software for interacting with a user and for uploading capture data to the computer. The capture device may include a series of built-in buttons that may be configured to initiate given commands. For example, capture data may be uploaded to the computer via the wireless link, COM cable, or the like, by the user pressing some of the buttons to initiate the upload process. After the upload completes, the user may delete the capture data from the capture device. The capture device may include a small text-based display to show short text messages to the user.

In an alternate embodiment, the capture device may include local intelligence for performing recognition and uploading the recognized data to the computer for further processing.

Since digital handwriting capture is not limited to physical flat panel devices, in another alternative embodiment the capture device may include electronic reusable paper, for example. Electronic reusable paper is designed to have the look and feel of normal paper, except that it contains tiny sensor network technologies that provide digital display and capture of handwritten scribbles. Similar to a flat panel device, data can be captured, except that in the case of electronic reusable paper that data is collected and stored by the paper itself. Data collection from electronic reusable paper may be implemented in many ways, including attaching the paper to a clipboard containing the electronics required to retrieve data from the electronic reusable paper and forwarding the data obtained using standard methods.

An example of electronic reusable paper is SmartPaper manufactured by Gyricon LLC.

Figure 2:
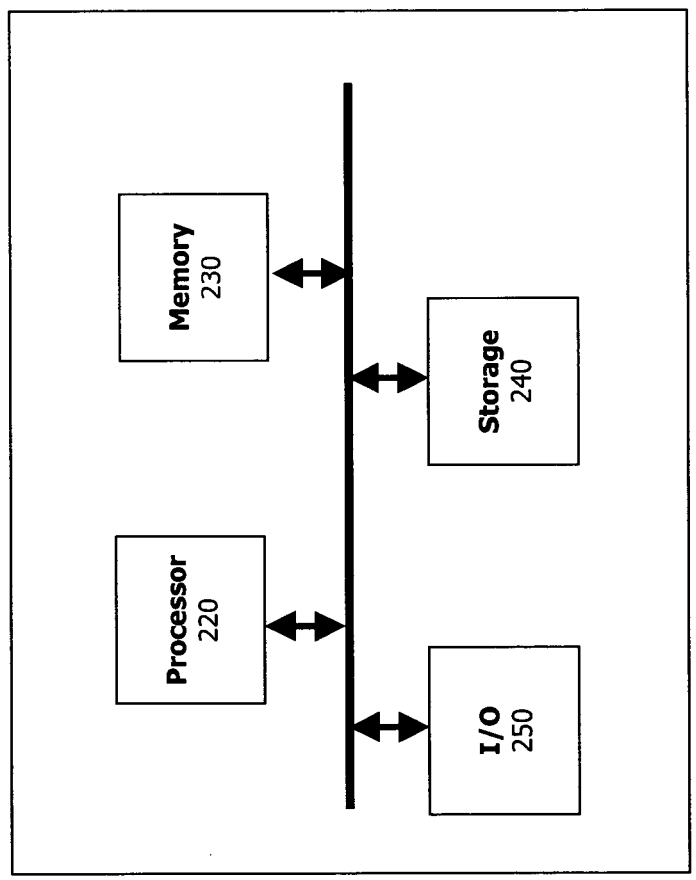
FIG. 2 is an exemplary computer used to identify multiple questionnaire pages according to embodiments of the present invention.

FIG. 2 is a block diagram of an exemplary computer that can implement embodiments of the present invention. The computer 200 may receive capture data from the capture device according to embodiments of the present invention. The computer 200 may include, but is not limited to, a processor 220 provided in communication with a system memory module 230, a storage device 240, and an I/O device 250. The processor 220 may perform data recognition with the capture data received from the capture device. The memory 230 may store program instructions to be executed by the processor 220 and also may store variable data generated pursuant to program execution. In practice, the memory 230 may be a memory system including one or more electrical, magnetic, or optical memory devices. The I/O device 250 may include a docking station for interface to the capture device 160 to receive the capture data and transmit any other appropriate data between the capture device 160 and the computer 200.

In embodiments of the present invention, a paper form may have printed thereon data, including questions and their answer choices. Each answer choice may include a uniquely shaped check box that a user fills in when selecting that answer. For each question's answer choices, the corresponding unique shapes are grouped into logical sets. For example, in the questionnaire 360 in FIG. 3, the rectangle and circle shapes make up a logical set for Q1, the triangle, lightning bolt, and crescent shapes make up a logical set for Q2, etc. These groupings may be represented in memory 230 or storage 240 by common flags, variables, or any identifier capable of indicating the grouping. When a user fills out multiple copies of the paper form, the user fills in an answer for each question. This means that each time the user fills out the form, the user fills in one shape from each logical set. Accordingly, when the computer detects multiple shapes from the same logical set, the computer recognizes that more than one copy of the form has been filled out. Moreover, the computer uses the order in which the multiple shapes were captured to determine to which copy of the form each shape belongs. Hence, the computer is able to identify the multiple pages using these logical sets.

FIG. 3 is an example of a paper data form in which questionnaire answers are printed with uniquely shaped check boxes as described. In this example, the data form 300 may include, but is not limited to, a questionnaire 360 to be filled out where each question has a logical set of unique shapes associated therewith. The data form 300 may further include the identification 370 of the data form.

The data form 300 may be attached to the capture device 160 and an answer for each question in the questionnaire 360 chosen by filling in the answer's check box. The coordinates of the marks made when filling in the check box may be recorded on the capture device 160 and later uploaded to the computer 120 for processing according to embodiments of the present invention. A check box may be filled in by shading the entire box. The check box need not be filled in perfectly, as any well-known shape recognition technique may correctly identify the shape from imperfect or incomplete capture data.

In systems with a variety of data forms, an identification 370 of the data form may be uploaded to the computer 120 so that the computer 120 may retrieve the appropriate predefined shapes for that data form. In one embodiment, the form identification 370 may have a check box associated with it that the user checks. The position of the filled-in identification box may indicate to the computer 120 which data form is being used. The position of the identification box may includes some tolerance to allow for data form shifting.

It is to be understood that the form is not limited to a shape appearing only once per form, as shown in FIG. 3. The shape may be repeated at different intervals on the form as long as the shape does not appear more than once per question. In this instance, the computer may use the shape alone or the shape and the position of the check boxes to detect filled-in shapes belonging to the same logical set.

Figure 4:
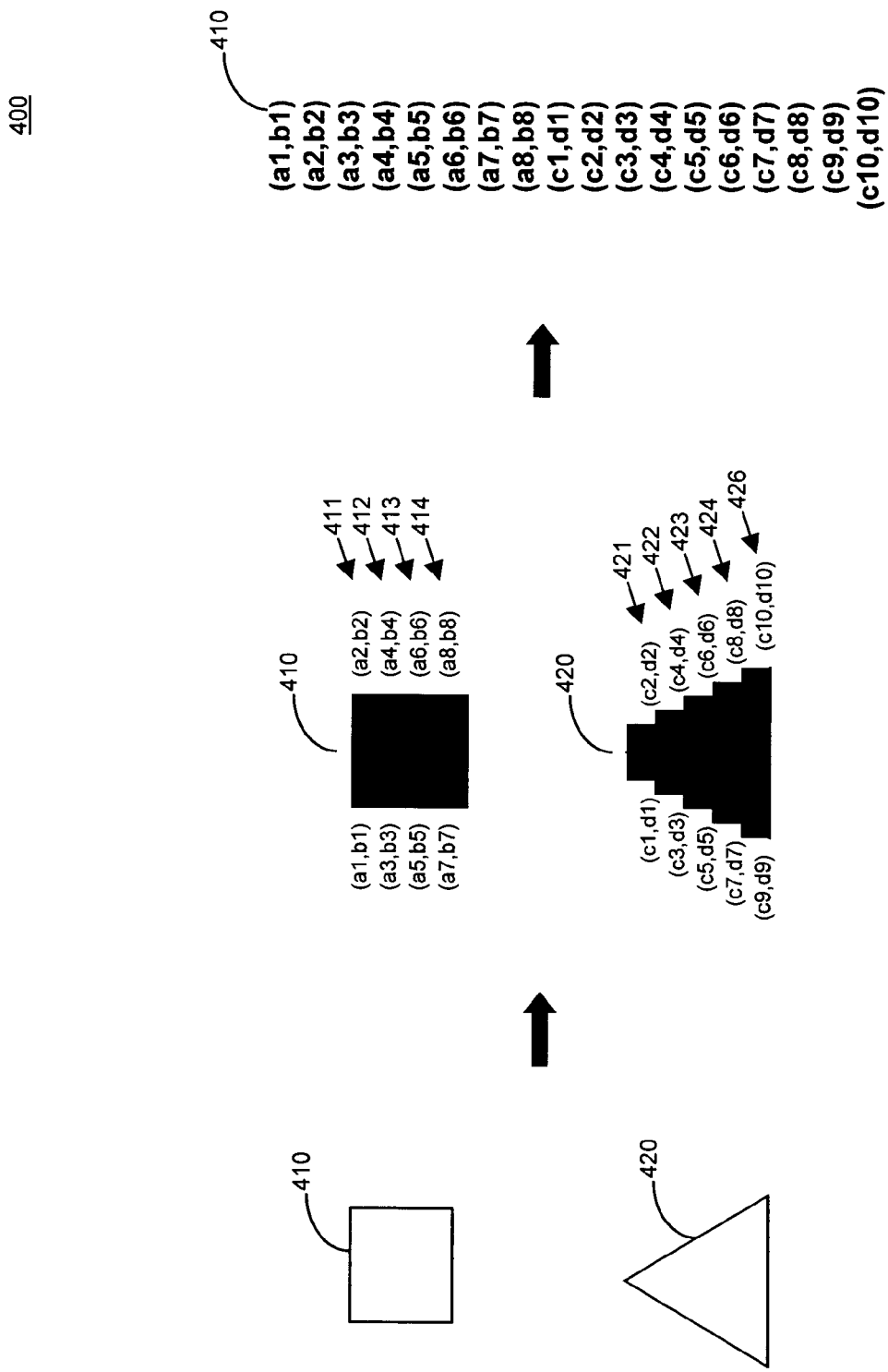
FIG. 4 is an exemplary data capture format according to an embodiment of the present invention.

FIG. 4 illustrates an example of the capture data format that may be used in embodiments of the present invention. In this example, the user filled in the square check box 410 indicating a selection of the answer having the square check box. The user made 4 pen strokes 411–414 to fill in the square check box 410. The capture device digitally captured the pen strokes 411–414 as time ordered coordinates. Here, (a1,b2) and (a2,b2) are the end coordinates for the first pen stroke 411, (a3,b3) and (a4,b4) are the end coordinates for the second pen stroke 412, (a5,b5) and (a6,b6) are the end coordinates for the third pen stroke 413, and (a7,b7) and (a8,b8) are the end coordinates for the final pen stroke 414. The user filled in the check box 410 left to right, top to bottom. Hence, the corresponding coordinates were uploaded to the computer in that order, as illustrated by 410. The processor 220 may calculate the shape these pen strokes made by detecting the perimeter of the shape formed by end coordinates of the pen strokes. The processor 220 may further use the ordering as indication of when the marks were made, i.e., relative to each other.

Similarly, the user filled in the triangle check box 420 indicating a selection of the answer having the triangle, check box. In this example, the user made 5 pen strokes 421–426 to fill in the triangle check box 420. The capture device then digitally captured the pen strokes 421–426 as time ordered coordinates (c1,d1) through (c10,d10) and uploaded them to the computer in that order, as illustrated by 410.

It is to be understood that the left to right, top to bottom order of the pen strokes is for explanation purposes only. The pen strokes may be made in any random order, orientation, position, or manner to fill in the check box.

In this example, the capture device 160 captures the two end point coordinates of the pen strokes. The capture device 160 may digitally capture additional (x,y) coordinates along the trajectory of the drawn line, depending on the application.

If the square check box 410 and the triangle check box 420 are determined to belong to the same logical set, the computer may determine that coordinate (c1,d1) begins the next page of the questionnaire and then process this capture data on the next page according to embodiments of the present invention.

These embodiments represent shape information as end point coordinates of the pen strokes used to fill in the shape. It is to be understood that the shape information may be represented in this or any other suitable manner.

Figure 5:
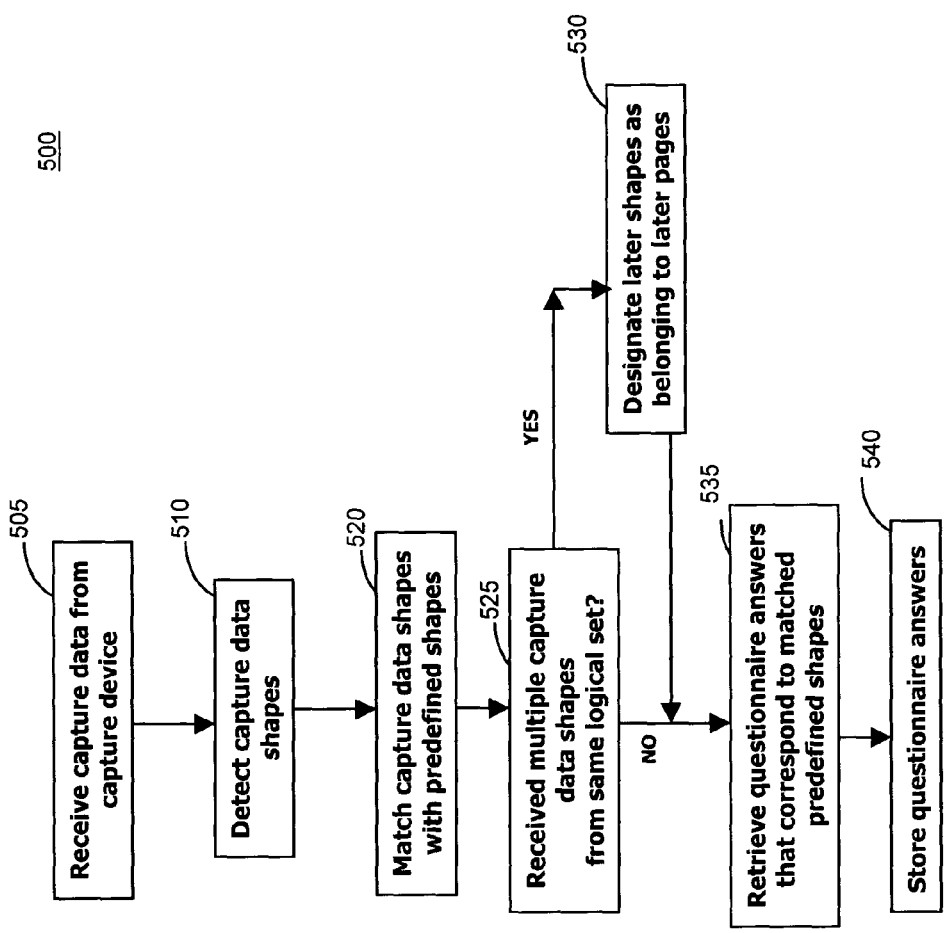
FIG. 5 is a flowchart of an embodiment of a method according to the present invention.

FIG. 5 is a flowchart of an embodiment of a method for identifying multiple questionnaire pages according to the present invention. The processor 220 may receive (505) capture data from the capture device 160. As stated previously, the capture data may include, but is not limited to, a time-ordered set of coordinates indicating the shapes on each page of a paper data form sets of marks made to fill in check boxes of chosen questionnaire answers. The processor may then use shape recognition techniques to detect (510) the shapes made by the sets of marks. Next, the processor 220 may compare (520) the detected shapes with a set of predefined shapes in memory 230 or storage 240 belonging to a logical set in order to find matches for the capture data. The predefined shapes may define the unique shapes belonging to each logical set expected to be on the questionnaire.

In a system where a variety of questionnaires may be used, the processor 220 may also receive the form identification from the capture device 160. Each questionnaire may have a check box for identification. The captured form identification may be indicated by a set of coordinates, vectors, etc., indicating the set of marks made on the paper data form to check the identification check box. Prior to retrieving the predefined questionnaire shapes, the processor 220 may detect the location of the form identification marks and then identify the form being used based on the marks' location. The processor 220 may then determine the predefined shapes in memory 230 or storage 240 based on the form identification and compare (520) the detected capture shapes with these determined predefined shapes.

If multiple detected shapes match (525) one or more of the predefined shapes in a logical set, then the processor 220 designates (530) to which page of the paper form each detected shape belongs. For example, in the questionnaire 360 of FIG. 3, the user may answer Q1 on page 1 by filling in the rectangle check box. The user may later answer Q1 on page 2 by filling in the circle check box. Accordingly, the capture device 160 records a set of coordinates for the rectangle check box and later a set of coordinates for the circle check box. When the processor 220 receives both sets of coordinates and detects the two shapes, the processor 220 determines that the rectangle and circle belong to the same logical set and, hence, correspond to different copies of the form, i.e., pages 1 and 2.

As previously described, the capture device 160 captures the time when a mark was made, either implicitly, in the ordering of the sequence of (x,y) coordinates, or explicitly, in the vector coordinates (x,y,t), for example. So, the processor 220 can determine using the time data which shape was generated later by the capture device 160. This indicates that the later generated shape in on the next or later page. In this example, the processor 220 determines that the circle was filled in later because the coordinates for the circle appear later in the capture data. So, the processor 220 determines that the circle shape data begins the next page.

If the user incorrectly answers a question, the user should be able to correct the answer without the processor 220 mistaking the two answers for intended answers on different pages of a questionnaire. Accordingly, embodiments of the present invention provide a way for the user to change an answer to a question by crossing out the incorrect answer. Hence, a filled-in shape having thereon cross marks may be discarded as an incorrect answer and the filled-in shape recorded immediately thereafter may be identified as the correct answer. In these instances, the capture device 160 records more than one set of marks for the same question. The capture device 160 records the set of marks for filling in a shape associated with a first answer, the set of marks for crossing out the first shape, and the set of marks for filling in a shape associate with a second answer. Hence, the first shape and the cross marks may be discarded.

For example, in the questionnaire 360 in FIG. 3, the user may fill in first the pentagonal-shaped check box for Q4. The user may then change her mind and cross out the pentagonal-shaped check box. The user may then fill in the diamond-shaped check box for Q4. The processor 220 then detects the pentagon and diamond shapes. The processor 220 also detects the cross marks. Using the coordinate and time data, the processor 220 determines that the cross marks were made after and on top of the pentagonal-shaped check box. So, the processor 220 determines that the pentagonal-shaped check box belongs to the incorrect answer and discards the pentagonal-shaped check box and cross mark coordinates. Using the time data, the processor 220 then determines that the diamond-shaped check box was filled in after the crossed-out pentagonal-shaped check box; hence, the diamond-shaped check box belongs to the intended answer.

Suppose, in this example, that the processor 220 later detects another set of marks corresponding to the heart-shaped check box in Q4 of FIG. 3. In this case, the processor 220 determines that neither the preceding diamond-shaped check box nor the current heart-shaped check box have been crossed out. Accordingly, the processor 220 determines that the heart-shaped check box belongs to a later page of the questionnaire. Accordingly, embodiments of the present invention may advantageously distinguish between an incorrect answer on a page of the questionnaire and an intended answer on another page.

After the processor 220 has detected (525) the multiple intended shapes and designated (530) them as belonging to different pages of the questionnaire, the processor 220 may retrieve (535) from memory or storage the answers associated with the predefined shapes that match the detected capture shapes and then store (540) the questionnaire answers according to the page of the form to which they belong.

If the capture data shape matches a predefined shape that belongs to a logical set that did not include other matches, then the processor 220 may store (540) the questionnaire answer associated with the retrieved predefined shape as the first page of the paper form.

The processor 220 may alternatively retrieve the predefined shapes from memory or storage, one at a time or together, prior to the comparison with the captured shapes and then store the questionnaire answers that match the captured shapes according to the page of the form to which the answers belong.

As stated previously, in an alternate embodiment, rather than have multiple copies of a one-page questionnaire, a questionnaire with multiple pages may be processed according to embodiments of the present invention. In this embodiment, multiple pages have different questions, however, the shapes used for the answers are in the same order and logical sets on each page. For example, the first page of the questionnaire 360 in FIG. 3 has 4 questions and logical sets associated therewith. Therefore, the second page of the questionnaire 360 (not shown) will also have 4 questions (Q5–Q8) and the same check box shapes and logical sets as Q1–Q4, respectively. Accordingly, the multiple pages may be identified as previously described.

In another alternative embodiment, the capture device 160 may perform the page identification. After which, the capture device 160 may upload the page identification to the computer 120 for further use or storage.

In another alternate embodiment, a user may trace the perimeter of the check boxes rather than fill them in. The capture device 160 may then record the pen strokes corresponding to the shape perimeter. The processor 220 may use any shape recognition techniques to determine the shape of the check box.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
   receiving a set of coordinates from a capture device, the set of coordinates representing shapes made by a user on multiple pages of a paper form;
   mapping each shape to a questionnaire answer on a different one of the multiple pages; and
   identifying the multiple pages, including
      receiving multiple sets of coordinates corresponding to the same data,
      determining the order in which the multiple sets of coordinates was captured by the capture device, and
      assigning each set to a different one of the multiple pages in the determined order,
   wherein the paper data form is attached to the capture device, the data form including the multiple pages and a plurality of boxes, each box having a unique shape and corresponding to a questionnaire answer,
   wherein each of the shapes is made by filling in one of the boxes.

2. The method of claim 1, wherein determining the order in which the multiple sets of coordinates was captured by the capture device comprises:
   identifying when the shapes were made on the multiple pages, and
   ordering the multiple sets of coordinates based on the identification.

3. The method of claim 1, wherein identifying the multiple pages includes receiving multiple sets of coordinates corresponding to data belonging to the same logical set.

4. The method of claim 1, wherein the sets of coordinates indicate when and where the shapes were made.

5. A method comprising:
   receiving a set of coordinates from a capture device, the set of coordinates representing shapes made by a user on multiple pages of a paper form;
   mapping each shape to a questionnaire answer on a different one of the multiple pages; and
   discarding a mistakenly filled-in box, including
      receiving the set of coordinates corresponding to the mistakenly filled-in box and the set of coordinates corresponding to a cross-out line,
      determining that the cross-out line was drawn across the mistakenly filled-in box on the paper form, and
      eliminating the set of coordinates corresponding to the mistaken filled-in box and the set of coordinates corresponding to the cross-out line,
   wherein the paper data form is attached to the capture device, the data form including the multiple pages and a plurality of boxes, each box having a unique shape and corresponding to a questionnaire answer,
   wherein each of the shapes is made by filling in one of the boxes.

6. The method of claim 5, wherein the set of coordinates is a set of time ordered coordinates (x,y) of the shapes made on the multiple pages of the paper form.

7. The method of claim 5, wherein the set of coordinates is a set of vector coordinates (x,y,t) of the shapes made on the multiple pages of the paper forms.

* * * * *